(12) United States Patent
Bendiksen et al.

(10) Patent No.: US 6,373,490 B1
(45) Date of Patent: *Apr. 16, 2002

(54) USING REMEMBERED PROPERTIES TO CREATE AND REGENERATE POINTS ALONG AN EDITABLE PATH

(75) Inventors: Matthew Bendiksen, McKinney; Dennis E. Griffin, Plano, both of TX (US)

(73) Assignee: Macromedia, Inc., San Francisco, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/036,567

(22) Filed: Mar. 9, 1998

(51) Int. Cl.[7] ................................. G06T 11/20
(52) U.S. Cl. ................ 345/441; 382/187; 345/442
(58) Field of Search ................ 345/441, 442, 345/443, 431, 432, 429, 581, 589; 382/187

(56) References Cited

U.S. PATENT DOCUMENTS

| | | | | |
|---|---|---|---|---|
| 5,216,755 A | * | 6/1993 | Walker et al. | 395/132 |
| 5,347,620 A | * | 9/1994 | Zimmer | 395/129 |
| 5,412,402 A | * | 5/1995 | Searby et al. | 345/153 |
| 5,717,848 A | * | 2/1998 | Watanabe et al. | 395/174 |
| 5,768,417 A | * | 6/1998 | Errico et al. | 382/186 |
| 5,999,190 A | * | 12/1999 | Sheasby et al. | 345/431 |

OTHER PUBLICATIONS

Hsu et al ("Skeletal Strokes": 1993 ACM 0–89791–628–X/93/0011, 1993.*

* cited by examiner

Primary Examiner—Mark Zimmerman
Assistant Examiner—Mano Padmanabhan
(74) Attorney, Agent, or Firm—Fulbright & Jaworski L.L.P.

(57) ABSTRACT

A graphical rendering system and method is disclosed which stores generated and calculated path parameters along the entire user drawn path. These stored parameters are then editable or otherwise filtered at any point so as to create for the user different effects without the necessity of redrawing any portion of the path. Color changes or blends can be created along the length of the path or at any specific segment such as overdraws where the color is darker due to the overdraw. The system and method allow for changing of pen type and for giving different weights to certain of the stored parameters depending upon the currently selected pen type, color choice, light source shading, or desired rendered media.

23 Claims, 3 Drawing Sheets

USING REMEMBERED PROPERTIES TO CREATE AND REGENERATE POINTS ALONG AN EDITABLE PATH

REFERENCE TO RELATED APPLICATIONS

The present application is being concurrently filed with commonly assigned U.S. patent application, Ser. No. 09/037,720 entitled "RESHAPING OF PATHS WITHOUT RESPECT TO CONTROL POINTS", the disclosure of which is incorporated herein by reference and commonly assigned, U.S. patent application Ser. No. 09/037,721 entitled "USE OF FILTERS ATTACHED TO OBJECTS TO MODIFY THE APPEARANCE OF THE OBJECTS," the disclosure of which is incorporated herein by reference.

TECHNICAL FIELD OF THE INVENTION

This application relates in general to the generation and manipulation of computer graphic objects and more particularly to the storage of generated and calculated properties for the purpose of creating and rendering a graphic image.

BACKGROUND OF THE INVENTION

One prior art system for generating natural looking brush effects is by the creation and manipulation of vectors which define the graphic paths. Such existing systems typically have a predefined vector template that defines a particular brush appearance. Thus, there can be a water color vector template or a weiner dog vector template, or some other "defined" vector. After the user has drawn the path, the system then warps the selected vector template to the path taking the watercolor vector template, or the weiner dog vector template, and stretching along the path. This technique is more of a blend or stretch along a path.

Typically, the prior art systems use bezier paths and store the bezier path information. The problems of such prior art systems is that the user does not obtain realistic feedback as the stylus or mouse is moved. There might be some general outline that is created but not the actual brush image.

The user might get a general feel or how thick a brush stroke is being laid down, but cannot see the actual result until subsequent calculations are made. These calculations are typically not done until after the user has finished drawing the path with the mouse or stylus. The prior art systems interpret a bezier path based on certain sample points taken from the mouse or stylus. So, the actual path that is drawn by the user may not be the exact path that is rendered because these systems convert the original sample points to bezier paths thereby losing some fidelity in the path.

Another problem with the prior art technique is that you cannot obtain certain brush characteristics such as blackness buildup as you stroke a path, realistic texture effects, or other complex image level processing effects.

In addition, in prior art systems editing of these brushed paths is very limited. These systems can edit the particular vector template that is being used so, for example, a user can change from weiner dog template to watercolor template. The user can edit the shape of the bezier path but only by using the conventional bezier path control points. Prior art systems do not change the velocity or pressure at selected points nor do these systems change brush stroke width or any other properties that define the appearance of a brush stroke, except the path shape.

SUMMARY OF THE INVENTION

These and other objects, features and technical advantages are achieved by a system and method which stores fundamental data as a user generates a path and then uses this data to render the electronic image.

In essence, as the user picks up the brush tool and starts brushing, the system retains all the information needed to recreate the brush stroke that the user is creating. Examples of this retained information include the geographical location of where the mouse or stylus is traveling in a database coordinate system. In addition to such geographical data, the system also retains the pressure of the stylus, or pressure simulated keyboard shortcuts, as the user creates a single brush stroke. The system also retains the velocity of how fast the stylus is moving.

In relation to the geographical data, the system retains all the sample input information that it can obtain. The system keeps track of the brush properties used at different points, such as crayon, charcoal, quill or some other brush type that will create indescribable effects. Thus, the system does not store the appearance of the path but rather a very detailed description of the parametric data needed to generate the brushed path image. Thus, at any time the user can edit or filter any of this stored data to create any effect desired.

The user has full editability of all the brush parameters which means the user can change the type of brush or can just tweak little parts of the way the brush stroke is rendered. The user has full editability of all the polyline sample data which includes the geographical location, velocity, pressure and a random seed value stored at every sample point. The purpose of storing the random number at every point is so that every copy of the same rendered brushed image will have the same randomness to it. Thus, if a color is to change in a random fashion along a line, every time that brushed image is rendered, the color changes will be the same for that brushed image.

One technical advantage of the invention is that it allows a user to create artwork that is fully editable at all points.

Another technical advantage is the ability to allow a user to create artwork on a computer that contains effects that cannot be achieved with a canvas on an easel.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

Figure 1:
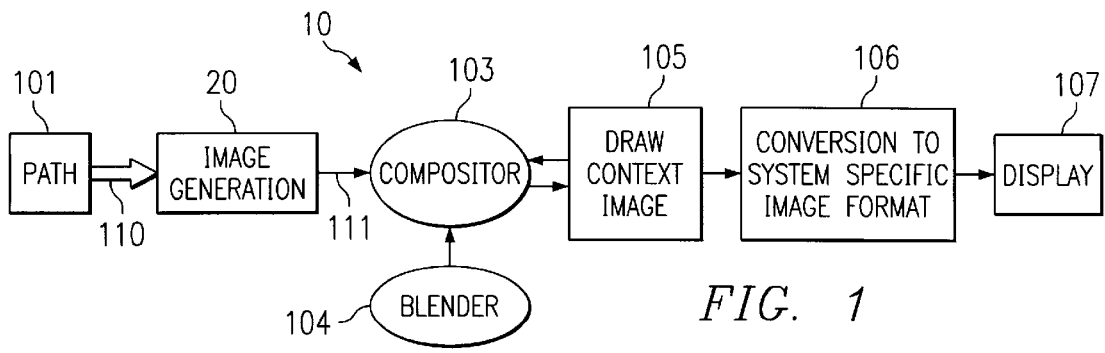
FIG. 1 shows a flow diagram of the overall system.

FIG. 1 illustrates flow diagram 10 which is a description of the rendering structure of a database which stores path data as generated by the movement of a stylus, mouse or other device across a defined space. The space can be two dimensional or more.

With respect to FIG. 1 and starting from the left, there is a path object 101 in the database and the path object is communicated via path 110 to image generator 20 to produce image 111 which is sent to compositor 103 which in turn composites the image object into a draw context image 105. Compositor 103 uses blender 104 (as will be discussed)

to determine exactly how the image is going to be blended into the draw context. Draw context image 105 feeds a conversion formatter 106 to a system specific image format 106 for display 107 on the system. This is disclosed in the above-identified related application entitled "RESHAPING OF PATHS WITHOUT RESPECT TO CONTROL POINTS".

Compositor 103, in addition to taking image data 111, also takes data from draw context image 105 during the blending process so as to provide a combination of data to be blended. Thus, the data from draw context image 105 and the data from input 111 are combined. In effect compositor 103 obtains the source destination pixels from block 105 to know how to properly form the image.

Compositor 103 uses standard image compositing techniques to combine image data 111 on top of the draw context image 105. This image compositing combines pixels using an algorithm defined by blender 104. Examples of such standard compositing algorithms used by blender 104 include alpha blend, pixel difference, pixel lighten, pixel darken, etc. Draw context image 105 is the image object that defines the entire user created artwork. Its bounds are the bounds of the artwork. Every path object 101 has its path image object composited into the same draw context image 105. The draw context image 105 is translated into a system specific image format 106. This image format is based on the native image format for the operating system. Once there exists a system specific image format 106, the image can be copied directly to the users display 107 for viewing by the user.

Figure 2:
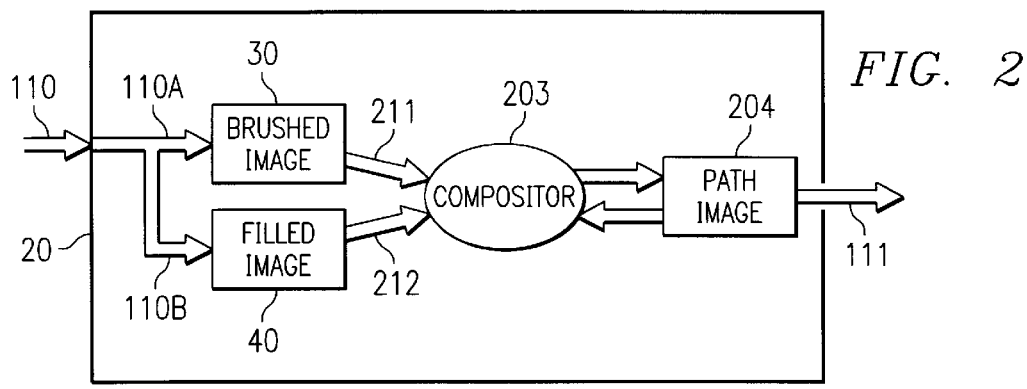
FIG. 2 illustrates an image generator.

FIG. 2 illustrates image generator 20 which is an overall view of the generation of image 111 as generated from input 110. Image generator 20 generates a brushed image 30 of that object and a filled image 40 of that object, and then sends both of these objects to compositor 203, via paths 211 and 212, respectively. Compositor 203 can be the same as compositor 103 shown in FIG. 1 which will generate overall path image 204 which is then used as image 111.

Figure 3:
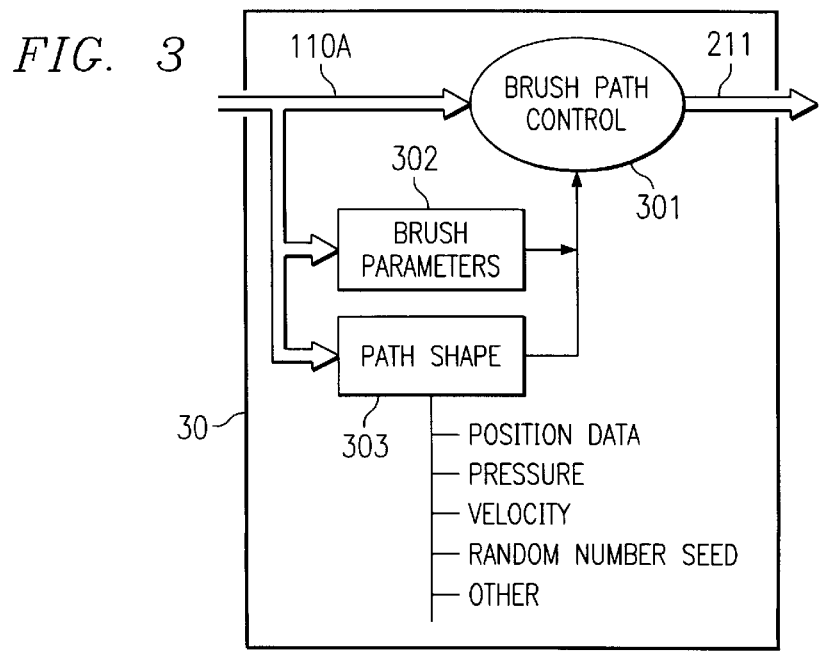
FIG. 3 illustrates the generation of the brushed image.

FIG. 3 shows the generation of brushed image 211 by brush image 30 (FIG. 2). Path 110A has attached to it several parameters. It has basic brush parameters 302 that describe the set of parameters that make up the data which is the brush. It also has path shape 303 which contains an array of points with each point containing the position data of that point, a pressure value, a velocity value, and random seed at that point, and can additionally contain other pertinent data. When brush path control 301 generates brushed image 211, it looks at brush parameters 302 and decides how to generate a stamp image that will be used, and it looks at the data from path shape 303 to determine how it should affect the parameters to generate different looking stamp image data as will be described later. Other parameters that can be stored in addition to position, pressure, velocity and a random number seed are entire sets of brush parameters that can be used to force interpolation between that position and a previous position. The stored parameters could be different colors at different positions in order to change the color along the path. There could be parameters which would control either a sharp break or an interpolation of the colors. Also, there could be stored the pitch and angle of the stylus being used on a point-by-point basis. Storage of data could expand to include any data that is generated by a user's input device. Some such data, such as position and pressure, are obtained directly from the input device. Other data, such as velocity, are generated.

Figure 4:
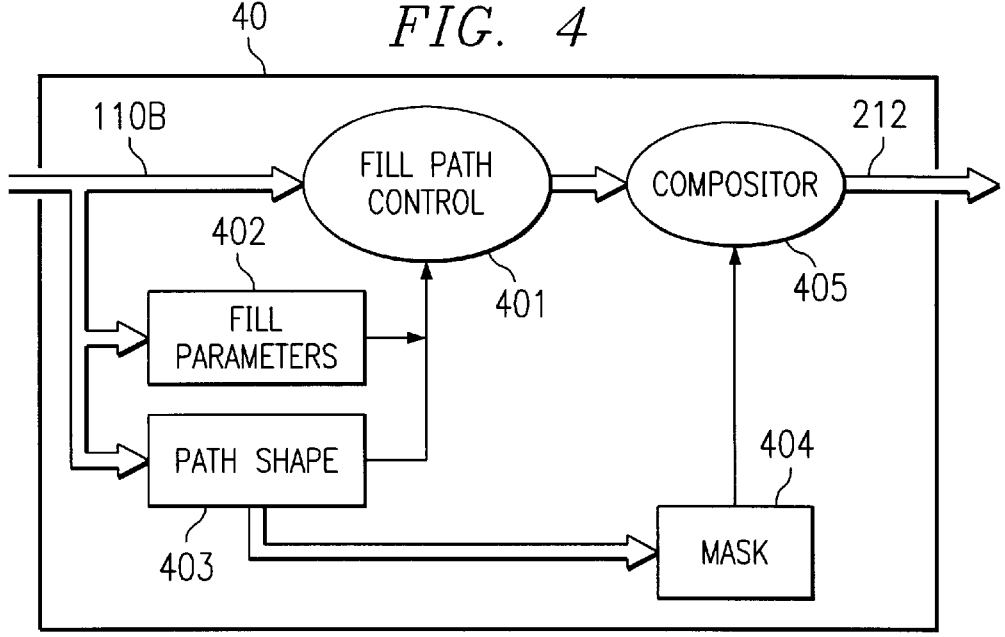
FIG. 4 illustrates the generation of the filled image.

Filled image 40 (FIG. 2) obtains data from input 110B. Fill path control 401 (FIG. 4) typically looks only to the coordinate part of the polyline information. Fill path control 401 typically ignores the velocity and pressure whereas brushed image 30 (FIG. 2) uses those more readily. Fill image 40 defines the way the interior part of the path will draw, whereas brushed image 30 defines the stroke that follows the shape of the path. In other words, brushed image 30 would follow both the inner and outer circles (paths) of the letter O, whereas filled image 40 would describe what is between them.

Using the coordinates of the polyline data, an image mask 404 is generated that defines the interior portion of the path. The fill path control 401 then produces an image using fill parameters 402. This image may contain repeating patterns of arbitrary images, a texture image, color gradients, or other algorithmically defined images. This fill path control generated image is then composited using compositor 405 and fill shape mask 404 to produce an image defined by the region of fill shape mask 404. Compositor 405 produces the resulting fill image data 212 by using standard image alpha blending techniques.

The system brush renders the final drawing based on polyline sample data. The sample data is typically calculated via the user's input with a mouse, stylus, or some other type of input device. The system records exactly what the stylus or mouse is inputting into the computer based on the coordinates of the input device. The pressure of the input device is also recorded. The system calculates and records the velocity and other parameters of the input device, as well as a random seed value. As the user is actually brushing, the system is polling the device to obtain and store in memory this information as fast as it possibly can while also doing background work, such as rendering the brush stroke. Using as short a time interval as possible, the system calculates these polyline sample nodes which make up the line sample data for the path. Potentially there can be more than one set of polyline sample data per path. This gets into the realm of composite paths, where a single path object can be made up of multiple polyline sample streams.

An example of this would be the letter O if it was converted into a path object. It would remain a single path object even though it contains two path segments of polyline data, one for the inner circle of the O and one for the outer circle of the O. The path object only has one set of brush parameters 302 describing the brush type that is going to be used.

The brush parameters 302 describe the way brush path control 301 will render the polyline same data described by path shape 303. Brush parameters 302 includes brush descriptions such as the ink concentration, ink buildup flag, hue, lightness, saturations, tip type, number of tips, flow rate, stamp spacing, stamp scatter, and a stamp parameters block 501. The stamp parameters 501 describes the stamp image that gets laid down along the polyline in between sample points at regular intervals as defined by stamp spacing. The stamp image can vary in size and what is called softness, which is how transparent the edges are. There is also a softness curve which defines how the transparency progresses from the center of the stamp image to the outer edge of the stamp image. The stamp image is typically an oval shape. However, it can be a rectangle or any other desired shape or image. For example, the stamp image could be a small image of a rose bud. For a typical brush, the stamp image size or its diameter is going to define the width of the brush stroke. Given two poly coordinates, a Bresenham algorithm is used to calculate the coordinate locations, at an interval defined by stamp spacing of brush parameters 302, between the two polyline sample coordinates. At these now computed coordinate locations, the stamp image is laid down into brushed image 30. Lay down refers to the process of actually alpha blending or compositing the stamp image into the brushed image 30.

Figure 6:
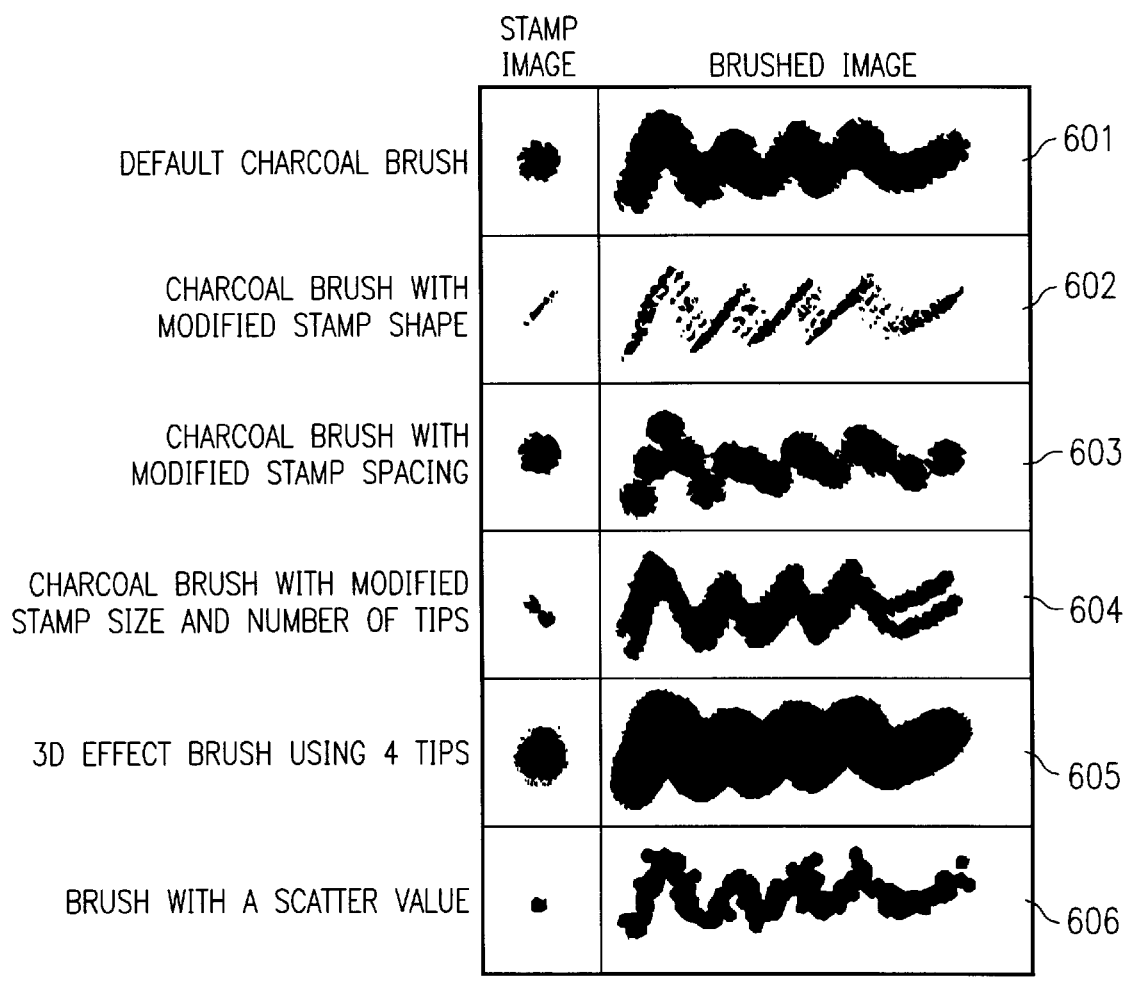
FIG. 6 shows various images.

FIG. 6 shows a table of typical stamp images and the related brushed image. These relationships are shown as 601 for a charcoal brush; 602 for a charcoal brush with a modified stamp shape; 603 for a charcoal brush with modified stamp spacing; 604 for a charcoal brush with modified stamp size and multiple tips; 605 for a 3D effect using 4 tips; and 606 for a scatter value brush. The actual compositing technique looks at brush parameters 302 to figure out exactly how it is going to composite. It looks at the concentration and the blackness. In other words, along the path between two points, there is calculated the stamp image that is composited into the destination brushed image 30 repeatedly at intervals that are calculated based upon the brushed parameters 302. Some of those parameters which determine the interval are stamp spacing and flow rate. Other parameters determine what colors are required as well as the blackness and opacity of the stamp image and texture of the stamp image. Texture modifies the transparency of the stamp image. These parameters determine the frequency and the nature of the stamp image which is basically a set of pixels that are composited, using alpha blending techniques, into the destination image.

Figure 5:
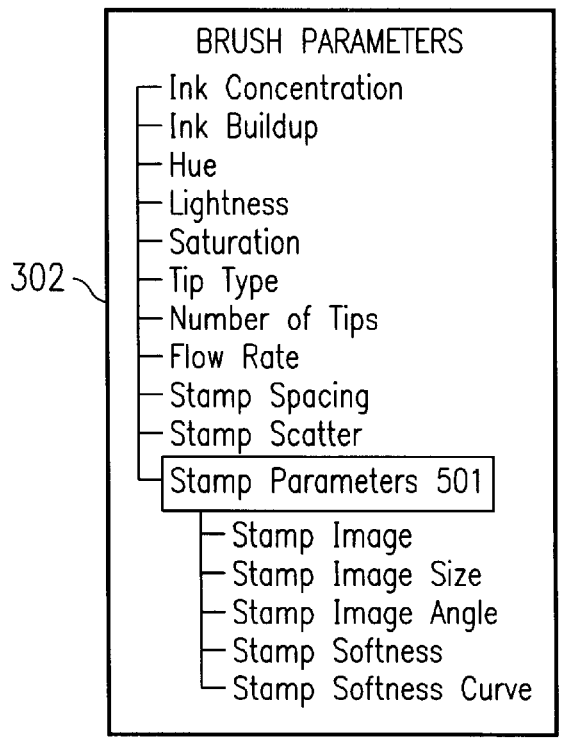
FIG. 5 illustrates some of the brush parameters.

In addition to this, brush parameters 302 (FIG. 5) can define more than one tip. For a typical brush, there is just a single tip, but there can be up to N tips where each tip follows its own trajectory between the two points. Brush parameters 302 defines a spacing between the tips. This spacing can be random or it can be calculated using a specific method. For example, if there are three tips, they can all line up diagonally at a 45 degree angle to one another. In addition to this, the colors used for the tips can vary just like the individual stamp image colors can vary. Also, it is possible, for example, to have three stamp images with the stamp image in the center having a defined color and two stamp images in addition to that one on either side having variable parameters.

By using multiple tips, a path can be given a rake brushed appearance.

For a 3D effect, the user can generate four stamp images that are tightly coupled together. The normal orientation of those is to have a stamp image in the center and then a triangle of stamp images around it, with a high degree of overlaps between the stamp images. The actual shape is almost circular with a slight bulge on the three corners where the triangle is. The individual colors of the tips can be varied to produce a 3D effect where the center stamp is the actual color desired and the other three stamps vary in lightness to produce a 3D effect. For example, these might be a red color in the center and the user chooses to vary the color based on lightness. The user can have in the upper lefthand corner a color which is a darker red, giving an effect as if the four stamp set is going from light red on the upper lefthand corner down to dark red on the lower righthand corner. This then will look like as though there is a light source, much like a shadow effect. If the user draws a path out of this stamp image configuration, then the whole path will appear like it is affected by that same lighting effect. Additionally, the user can vary the hue or the color on the different stamp images, giving an extruded look resembling a bunch of strings twisting in space.

One of the parameters 303 (FIG. 3) recorded is the velocity at any point. The reason that velocity is recorded is because the timing in between samples when sample nodes are being recorded is not necessarily constant due to the fact that personal computers are not realtime in nature so it cannot be guaranteed that when polling is taking place, data will be getting back at regular intervals. Thus, the time between the intervals and the distance in between the two points has to be calculated and based on that, the system calculates a velocity value that is stored at every point.

Some of the interesting and very useful brush properties that actually make up the stamp parameters 501 (FIG. 5) is the size of the stamp image and whether it is a square, circle, or some other shape. Size refers to diameter of the stamp image and shape refers to the overall shape appearance of the stamp image. Also, there is an angle of rotation, as well as there is a softness which is how soft or how transparent the edges of the stamp image appear. The size and the angle can both be affected by either pressure or velocity of the polysample nodes. When the brush path control 301 is rendering the brush image 30, it will look at the polyline sample data, look at the various velocities and pressures and, based on that, potentially calculate different stamp image sizes and different stamp image angles. Whether or not it does that is dependent on the brush properties 302. There is a section of brush properties which describe how various other brush properties are affected by pressure, velocity, randomness and direction. What this gives the user is the ability to pick up a brush and have it get thicker as the user presses harder so that if the brush is sensitive to pressure, such that the stamp image size gets bigger with increased pressure, then the harder the user pushes with his/her stylus, the thicker the path will become.

Also, the faster the velocity, potentially the smaller the brush stamp image size, giving the appearance that the brush was actually traveling faster at that point. In actuality, on paper, an observer can look at a brush stroke and determine where velocity has changed by observing the change in width of the brush stroke. For example, a crayon is not very pressure or speed dependent. It might be just a little as it gets slightly thicker or a little bit more opaque if it is pushed really hard, but the effect is negligible. Using a quill or one of the Japanese brushes, the faster you go, the thinner the brush stroke becomes. It is very noticeable. In our system all of that data is stored and generated so that the user may change certain particular parameters from time to time and obtain different renderings. Thus, as a user draws faster, a fast velocity is stored at those points. If the user draws with a hard pressure, a large pressure number is stored at those points. The system will select the parameters to be used and the weight to give to them. A crayon brush selection is not going to put heavy emphasis on the fact that there was a heavy pressure at a particular polyline node, and it will not affect the appearance of the rendered stroke very much, whereas something like a quill brush is going to put a very heavy emphasis on what the velocity was at the various polyline nodes. Another stamp parameter is the angle of the stamp image which can be sensitive to the direction that the brush stroke is going at different polyline node points. The direction is not stored at the polyline sample nodes, but it can be determined based on where the previous node was. Thus, the direction is something that is calculated while the brush path image is rendered. Thus, given that the system can calculate a direction at any given point along the path, the user can use that direction in a similar manner as velocity and pressure. The direction may be used to modify the angle of the stamp image. This is useful when the brush stamp image is not symmetrical on all axes. The system can then vary the angle of the stamp image based on the direction and on the selected brush parameters.

For example, some of the brush parameters 302 look at the directional information to determine the angle of the stamp image. This is important if it is desired to create a rice brush effect. If a rice brush is desired, the little kernels of rice line up in the direction that the brush stroke is traveling. Each brush can have the property of randomness applied to its varying axes of information. This is where the random number stored at every node is used. This is important for a scatter effect. Scatter is a brush property that defines where the stamp images line up along the line between two polyline node points. If scatter is zero, then the stamp images line up with their centers directly on the line between the two points. If there is a scatter, then those stamp images are scattered away from the line. Scatter can be varied and is inherently random. If there is a scatter value, then it will give the effect of a brush stroke that is not very smooth on the edges. It is rough in some places. If there is no scatter, then there is a smooth line without any protruding stamps.

Blackness is another interesting parameter of the brush. It defines how the stamp images blend together into the image that they are rendering themselves into. For every stamp image that is laid down, the brush path control looks at the background brush image and modifies the stamp image's individual pixels using an algorithm. The blackness algorithm modifies the stamp image's individual pixels by darkening them if they are about to be blended on top of a pixel in the background brush image that has some darkness. What this gives is a kind of dirty marker or black buildup effect. For example, when a highlighter or a felt tip pen is rubbed back and forth on the same area, a blackening of color will be noticed. It will not be the original color the user chose, but it will slowly get darker as the highlighter or felt tip pen is rubbed back and forth. Some brushes totally ignore this attribute. For example, charcoal brushes do not use blackness because when a piece of charcoal is used, the brush stroke does not get blacker. As it overdraws on top of itself, it might become more opaque, but the actual color does not become blacker as you rub back on top of itself. Another attribute is the ink concentration of the brush and that is defined as the opacity in the center of the brush stroke. For example, a highlighter has a very low ink concentration. When brushing with a highlighter, the rendered brush image is still relatively transparent even in the center of the brush stroke whereas a felt tip pen has a slightly higher ink concentration where the rendered brush image is still transparent but not as transparent as a highlighter brush.

Oil paint has a very high, almost opaque concentration. As the brush is rubbed back and forth on the same area, the mark gets more opaque so you have this effective buildup. If you take a highlighter pen with an ink concentration value of, for instance, 25%, then if a single brush stroke is drawn, the alpha will be 25% in the center of the stroke, or to put it another way, it will be 25% opaque and 75% transparent. A user would be able to see a lot of the underlying artwork that he/she is drawing with a highlighter on top of, but as you scrub back and forth, if you were to go back over that brush stroke, you have a buildup effect where it gets more and more opaque until finally it becomes 100% opaque and you cannot see the underlying artwork. This is an example of another property which is whether or not the brush builds up or not. Buildup defines whether or not, after going back over the same brush stroke multiple times, it becomes more opaque or not. With some brushes, no matter how many times you scrub on top of itself, the mark will never become any more opaque and the underlying art work will never be totally obscured.

This system has the capability of using all the data to generate this path and regenerate it. The user can modify the shape of the path, as described by path shape 303, or move the points around on it or the user can modify the brush parameters, as described by brush parameters 302, and go from using a charcoal brush to a crayon brush to a highlighter brush. Or the user can individually go in and modify one of the parameters on that brush object directly so the user can, for example, take a crayon brush and change the ink concentration or stamp image size or texture percentage. The user can also reshape the path. The user can also go back and modify, or reshape, a portion of a path if the user has drawn out a shape and they did not get exactly the right stroke at some position on the path.

Some other interesting concepts is that if you have a brush tool, which is varied according to pressure and/or velocity along the path, then you can change its nature. The system has the capacity to go back in and define regularization, either of the pressure so the user can have the path start out with full pressure, and then slowly fade out to no pressure at the end. This will be the same for velocity. Thus, if one of the brushes, like the Japanese water color brush, varies according to pressure or velocity, the user can define a pressure and could draw something and go back and say "ramp this" from 100% pressure and velocity down to 0% pressure and velocity, so as to define a smooth transition along the entire path, rather than having to force the user to be able to draw that effectively from the beginning. Re-editing all this data gives the user the capacity to go back and tweak all of the aspects of the artwork. There could be a brush which is varied on pressure and alters color in some fashion. The system could set up a mechanism for the user to have the pressure vary as a sine wave along the path, going from zero, up to high, down to zero, up to high, down to zero, whatever high is. If the color varies with pressure, it would have the effect of having a regular, repeating gradient pattern along the path, where it might go from green to red to blue, from pressure of zero, to 50% to 100% So, if the pressure was going from zero, 50, 100, 50, 100, 50, zero, there would be a regularly repeating pattern of red, green, blue, red, green, blue, green, red along the path. That is an interesting effect that the system can achieve by having these variable stored parameters of pressure velocity, etc. along the path, and having brushes which base their nature off of these varying parameters, and also which allow the user to edit the pressure, velocity, etc., along the path.

The system also has the potential to have the brush look at global settings, not just the polylined sample data, as defined by path shape 303, or the parametric set of parameters that defines that brush defined by brush parameters 302. For example, there could be a global light source to the document that the user can define as being, "I want my light source to be red and to be in the top left corner of the artwork." The brush path control could then look at that information and calculate the particular shade or some other, parameter of the brush, based on that light source and maybe based on its location, like, "Okay, I'm this far away from the light source and the light source is at this angle, therefore, I want to modify the hue of this stamp image by X%," for example. So there is also a whole set of potentially global parameters that the brush path control might look at to determine how it wants to render itself into the brushed image.

Pressure and velocity, which are stored at every single polyline node, do not directly effect the nature of the brush stroke or the appearance. The brush path control 301 looks at those node data, and at the brush's sensitivity parameters, to determine how it wants to vary other brush parameters. As was illustrated in another example, the quill brush looks at the velocity of the polyline nodes to determine what size of a stamp image to lay down. So the pressure and velocity, which are stored at every single point, are used as a reference for the brush path control to determine how much to modify various brush parameters.

In addition to being able to edit the polyline point data and the brush parameters, it is possible to edit the path on a more global scale. The path can be moved from one location in the database to another location in the database. Essentially what this is doing is offsetting all of the point coordinates for all the polyline nodes defined in path shape 303. In addition to the path being moved, it can also be scaled, rotated, skewed or transformed in any other mathematical way. Whenever those actions are done, the individual point coordinates are transformed by the action, so if the action is to rotate by 45°, then all the points are rotated by 45° about some user specified origin. If the action is to scale, then all the points are scaled by a specific point in space. Also, the brush stamp image size and some other brush parameters can be scaled. Therefore, by scaling a brush stroke, the result is a brush stroke that looks smaller, both in width and size of the stroke.

The invention would be implemented on a system which comprises a typical standalone personal computer, but could be part of a network system using terminals or workstations. Typical computer configuration is either a Macintosh computer or a Pentium PC running Microsoft Windows. The system would have 24 megabytes of RAM, but it could have less or it could have more. The system would have a processor speed of about 100 megahertz or higher, and a hard drive will have at least 500 megabytes of space. The monitor is preferably 17 inches, with a color depth in the millions of colors to allow for computer graphical manipulation of images, illustration and objects. Note that the invention is not limited to 2-dimensional computer graphics as it could be used for 3-dimensional computer graphics, as well as motion or animation graphics.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

Although the present invention and its advantages have been described in detail, it should be understood that various changes, substitutions and alterations can be made herein without departing from the spirit and scope of the invention as defined by the appended claims.

What is claimed is:

1. A method of creating a graphical path data structure, said graphical path data structure defining a single brush stroke, the method comprising the steps of:
    selecting a brush tool data structure, wherein the brush tool structure includes a plurality of brush parameters including a stamp image;
    receiving a first series of input parameters wherein said first series of input parameters comprises points of position information associated with an input peripheral, wherein said points define a path shape for said single brush stroke; and
    associating brush parameters of said brush tool data structure with each point of said first series of input parameters to create a path data structure, wherein a user may modify brush parameters associated with a portion of points of said first series of input parameters while leaving brush parameters associated with other points of said first series of input parameters unaffected.

2. The method of claim 1 further comprising the steps of:
    receiving input from a user to utilize a different stamp image at selected points of said first series of input parameters; and
    modifying the path data structure wherein the different stamp image is associated with the selected points and wherein other points of said first series of input parameters are unaffected.

3. The method of claim 1 wherein the step of receiving further comprises calculating velocity parameters to be stored in said path data structure, and wherein said method further comprises the steps of:
    receiving input from a user to modify velocity parameters at selected points of said first series of input parameters; and
    modifying the path data structure wherein velocity parameters are modified at said selected points and wherein other points of said first series of input parameters are unaffected.

4. The method of claim 1 further comprising the steps of:
    superimposing said stamp image over a graphics image according to said points.

5. The method of claim 4 further comprising the steps of:
    receiving a second series of input parameters, wherein said second series of input parameters are modifications of brush parameters of selected ones of said points of said path data structure; and
    modifying said path data structure according to said second series of input parameters.

6. The method of claim 5 further comprising the step of:
    re-superimposing said stamp image over said graphics image according to said modified path data structure.

7. The method of claim 4 wherein said step of superimposing comprises the sub-step of:
    generating a series of line segments according to said points.

8. The method of claim 4 wherein said step of superimposing occurs substantially simultaneously with the step of receiving a first series of input parameters.

9. A system for creating a path image representing a single brush stroke, the system comprising:
    means for defining brush parameters, wherein said means for defining brush parameters comprises at least a stamp image;
    means for defining a path shape, wherein said means for defining a path shape is operable to receive a first series of input parameters, said first series of input parameters comprising at least a plurality of points of position information, wherein said plurality of points define a path shape for said single brush stroke; and
    means for creating a brush path control from said brush parameters and said path shape, wherein said means for creating a brush path control is operable to associate said brush parameters with each point of said plurality of points, and wherein a user may modify a portion of said brush parameters of said brush path control associated with selected points while leaving brush parameters associated with other points unaffected.

10. The system of claim 9 further comprising:
means for receiving input from a user to utilize a different stamp image at selected points of said first series of input parameters; and
means for modifying said brush path control wherein the different stamp image is associated with said selected points and wherein other points of the first series of input parameters are unaffected.

11. The system of claim 9 further comprising:
means for receiving input from a user to modify velocity parameters at selected points of said first series of input parameters; and
means for modifying said brush path control wherein velocity parameters are modified at said selected points and wherein other points of the first series of input parameters are unaffected.

12. The system of claim 9 further comprising:
means for compositing, wherein said means for compositing is operable to superimpose said stamp image over a graphics image according to said plurality of points.

13. The system of claim 12 further comprising:
means for receiving a second series of input parameters, wherein said second series of input parameters are modifications of brush parameters of selected ones of said plurality of points of said brush path control; and
means for modifying said brush path control according to said second series of parameters.

14. The system of claim 13 wherein said means for compositing is operable to re-superimpose said stamp images over said graphics image according to said modified brush path control.

15. The system of claim 12 wherein said means for compositing comprises:
a means for generating a series of line segments according to said plurality of points.

16. The system of claim 12 wherein said means for compositing is operable to superimpose said stamp image substantially simultaneously with receipt of said first series of input parameters.

17. The system of claim 9 wherein first series of input parameters includes pressure parameters.

18. A system for creating a path image representing a single brush stroke, the system comprising:
a brush path control for defining a path image representing a single brush stroke, said brush path control comprising:
path shape parameters comprising at least a plurality of points defining a shape of said single brush stroke; and
brush parameters defining an appearance of said single brush stroke and wherein said brush parameters comprises at least a plurality of points of positional information;
wherein said brush path control associates brush parameters with each point of said plurality of points such that brush parameters associated with a portion of said plurality of points may be modified while leaving other points of said plurality of points unaffected;
a compositor algorithm that is operable to utilize said brush path control to render said single brush stroke on a graphical image.

19. The system of claim 18 wherein said path shape parameters comprises pressure parameters.

20. The system of claim 18 wherein said path shape parameters comprises velocity parameters.

21. The system of claim 18 wherein said path shape parameters comprises angular orientation parameters.

22. The system of claim 18 further comprising:
a path reshaping algorithm for receiving user input to modify a selected portion of said plurality of points.

23. The system of claim 19 further comprising:
a brush parameters editing algorithm that is operable to modify brush parameters according to user input associated with a selected portion of said plurality of points while leaving brush parameters associated with other points of said plurality of points unaffected.

\* \* \* \* \*